US010558686B2

(12) United States Patent
Drushku (10) Patent No.: US 10,558,686 B2
(45) Date of Patent: Feb. 11, 2020

(54) BUSINESS INTELLIGENCE SYSTEM DATASET NAVIGATION BASED ON USER INTERESTS CLUSTERING (71) Applicant: SAP SE, Walldorf (DE)

(72) Inventor: Krista Drushku, Paris (FR)

(73) Assignee: SAP SE, Walldorf (DE)

( * ) Notice: Subject to any disclaimer, the term of this patent is extended or adjusted under 35 U.S.C. 154(b) by 288 days.

(21) Appl. No.: 15/448,283

(22) Filed: Mar. 2, 2017

(65) Prior Publication Data
US 2018/0157734 A1   Jun. 7, 2018

Related U.S. Application Data (60) Provisional application No. 62/430,248, filed on Dec. 5, 2016.

(51) Int. Cl.
G06F 16/30     (2019.01)
G06F 16/28     (2019.01)
G06Q 30/02     (2012.01)

(52) U.S. Cl.
CPC ....... G06F 16/285 (2019.01); G06Q 30/0201 (2013.01)

(58) Field of Classification Search
CPC .......................... G06F 16/285; G06Q 30/0201
See application file for complete search history.

(56) References Cited

U.S. PATENT DOCUMENTS

| | | | |
|---|---|---|---|
| 6,523,026 B1 * | 2/2003 | Gillis | G06F 16/3332 |
| 8,725,756 B1 * | 5/2014 | Garg | G06F 16/9574 |
| | | | 707/767 |
| 9,098,569 B1 * | 8/2015 | Bhagat | G06F 16/24578 |
| 9,501,585 B1 * | 11/2016 | Gautam | G06F 16/26 |
| 2008/0281915 A1 * | 11/2008 | Elad | G06Q 10/10 |
| | | | 709/204 |
| 2010/0169342 A1 * | 7/2010 | Kenedy | G06F 16/9535 |
| | | | 707/758 |
| 2010/0250578 A1 * | 9/2010 | Athsani | G06Q 30/0256 |
| | | | 707/765 |
| 2013/0254155 A1 * | 9/2013 | Thollot | G06F 16/3338 |
| | | | 707/602 |
| 2015/0039292 A1 * | 2/2015 | Suleman | G06F 17/289 |
| | | | 704/9 |
| 2015/0095194 A1 * | 4/2015 | Maslovskis | G06Q 30/0625 |
| | | | 705/26.62 |

(Continued)

OTHER PUBLICATIONS

J. Aligon, E Gallinucci, M. Golfarelli, P. Marcel, and S. Rizzi. A collaborative filtering approach for recommending OLAP sessions. DSS, 69:20-30, 2015.

(Continued)

Primary Examiner — Tarek Chbouki
(74) Attorney, Agent, or Firm — Jones Day (57) ABSTRACT The current subject matter provides systems, methods, computer program products (including graphical user interfaces) in which user interests can be identified by characterizing the intent of the interaction with a data source such as a business intelligence (BI) system. A set of features can be identified for an adequate description of intents, and a similarity measure for grouping intents into coherent interests. Related systems, apparatus, and methods are also disclosed.

15 Claims, 3 Drawing Sheets

(56) References Cited

U.S. PATENT DOCUMENTS

| | | | |
|---|---|---|---|
| 2016/0092598 A1* | 3/2016 | Mishra | G06F 16/9535 707/740 |
| 2016/0182222 A1* | 6/2016 | Rane | H04L 9/008 713/168 |
| 2018/0075092 A1* | 3/2018 | Hernandez Sanchez | G06F 16/2425 |

OTHER PUBLICATIONS

J. Aligon, K. Boulil, P. Marcel, V. Peralta. A Holistic Approach to OLAP Sessions Composition: The Falseto Experience. ACM Seventeenth International Workshop on Data Warehousing and OLAP (DOLAP 2014), Nov. 2014, Hong-Kong, China. <10.1145/2666158. 2666179>. <hal-01170970> (24 pages).

J. Aligon, M. Golfarelli, P. Marcel, S. Rizzi, and E. Turricchia. Mining Preferences from OLAP Query Logs for Proactive Personalization. In ADBIS, pp. 84-97, 2011.

J. Aligon, M. Golfarelli, P. Marcel, S. Rizzi, and E. Turricchia. Similarity Measures for OLAP Sessions. KAIS, 39 (2):463-489, 2014.

B. Desgraupes. Clustering indices. Technical report, University Paris Ouest—Lab Modal'X, Apr. 2013. (34 pages).

M. Ester, H.-P. Kriegel, J. Sander, and X. Xu. A Density-Based Algorithm for Discovering Clusters in Large Spatial Databases with Noise. In KDD, pp. 226-231, USA, 1996. AAAI Press.

W. Gatterbauer. Databases will Visualize Queries Too. Proceedings of the VLDB Endowment 4(12):1498-1501 (2011).

R. Guha, V. Gupta, V. Raghunathan, and R. Srikant. User Modeling for a Personal Assistant. In WSDM, pp. 275-284, Shanghai, China., 2015.

L. Kaufman and P. Rousseeuw. Clustering by means of medoids. In Statistical Data Analysis based on the L1 Norm, pp. 405-416. Elsevier, 1987.

L. Kaufman and P. Rousseeuw. Finding groups in Data: An introduction to Cluster Analysis. Wiley, 1990.

B. Mobasher. Data Mining for Web Personalization. In the Adaptive Web: Methods and Strategies of Web Personalization, vol. 4321 of LNCS, pp. 90-135, 2006.

H. V. Nguyen and al. Identifying User Interests within the Data Space—a Case Study with SkyServer. In EDBT, pp. 641-652, 2015.

F. Pedregosa and al. Scikit-learn: Machine Learning in Python. Journal of Machine Learning Research, 12:2825-2830, 2011.

Y. Song and Q. Guo. Query-Less: Predicting Task Repetition for NextGen Proactive Search and Recommendation Engines. In WWW, pp. 543-553, 2016.

Y. Sun, N. J. Yuan, Y. Wang, X. Xie, K. McDonald, and R. Zhang. Contextual Intent Tracking for Personal Assistants. In SIGKDD, pp. 273-282, 2016.

H. Wang, Y. Song, M.-W. Chang, X. He, R. W. White, and W. Chu. Learning to Extract Cross-Session Search Tasks. In WWW, pp. 1353-1363, 2013.

L. Yang, Q. Guo, Y. Song, S. Meng, M. Shokouhi, K. McDonald, and W. B. Croft. Modeling User Interests for Zero-query Ranking. In ECIR, pp. 171-184, 2016.

* cited by examiner

BUSINESS INTELLIGENCE SYSTEM DATASET NAVIGATION BASED ON USER INTERESTS CLUSTERING

RELATED APPLICATION

This application claims priority to U.S. Pat. App. Ser. No. 62/430,248 filed on Dec. 5, 2016, the contents of which are hereby fully incorporated by reference.

BACKGROUND

Business Intelligence (BI) computing system users range from executives to data enthusiasts who share a common way of interaction: they navigate large datasets by means of sequences of analytical queries elaborated through user-friendly interfaces. For example, users may express their information needs via keywords, and let the system infer from them the most probable formal queries (generally MDX or SQL) to be send to the underlying data sources (generally data warehouses or databases). As information needs do not have a status per se, it usually takes many interactions with the system to satisfy an information need, and the overall session is often a tedious process, especially in the case when the information need is not even clear for the user. This bears resemblance with web search where users typically need to repeatedly query the search engine to determine whether there is interesting content.

Being able to automatically identify user interests from BI interactions is a challenging problem that has many potential applications: collaborative recommendation (of data or dashboards), repetitive task prediction, alert raising, etc. therefore reducing the tediousness of the analysis. The difficulty of this problem lies in the fact that user interests are hidden in the interactions, and two users with the same interest would probably interact with the system differently. As in web search where users may have no idea of the retrieval algorithm, BI user are generally ignorant of the data sources and the formal queries they trigger.

SUMMARY

It is quite common these days for experts, casual analysts, executives or data enthusiasts, to analyze large datasets using user-friendly graphical user interfaces on top of Business Intelligence (BI) systems. However, current BI systems do not adequately detect and characterize user interests, which may lead to tedious and unproductive interactions. With the current such matter, user interests can be identified by characterizing the intent of the interaction with the BI system. With an eye on user modeling for proactive search systems, a set of features can be identified for an adequate description of intents, and a similarity measure for grouping intents into coherent interests. This approach was validated with a user study in which traces of BI navigation were analyzed. The similarity measure provided herein outperforms conventional query similarity measures and yields a very good precision with respect to expressed user interests.

In one aspect, first user-generated input by a user is received in a graphical user interface forming part of an end-user layer of a business intelligence system. The first user-generated input includes a partial query having at least one initial token. Thereafter, a data warehouse layer of the business intelligence system, determines at least one additional token to recommend for the query. Such determined at least one additional token can then be displayed in the graphical user interface. Second user-generated input can be received in the graphical user interface that selects one or more of the at least one additional token. In response, the data warehouse layer generates a final query based on the received second user-generated input. The data warehouse layer then initiates retrieval of data implicated by the final query. The determining is based on a clustering of interests of the user based on pre-defined clusters that are based on similarity measures among features of historical queries of the business intelligence system that indicate similar user interests.

There can be a plurality of different similarity measures that are applied to disjoint features. The similarity measures can be one or more of: cosine-based similarity measures, maximum fraction of observations-based similarity measures, Jaccard-based similarity measures, or normal integer-based similarity measures.

The features of historical queries can be one or more of frequency of tokens, frequency of refining tokens, suggestions, business intelligence questions, hierarchical questions relationships, or temporal question relationships.

The features of historical queries can be one or more of frequency of query parts of a selected suggestion, frequency of matching tokens forming parts of queries, or selected suggestions.

The features of historical queries can be one or more of levels in query parts, tuples retrieved by chosen queries, differences in queries that are below a pre-defined threshold, data sources implicated by the query, attributes of a first query identifying attributes of a second query, or expertise level of users.

The pre-defined clusters can be generated using a clustering algorithm employing a technique such as centroid-based clustering, connectivity-based clustering, and/or density-based clustering.

The features can be extracted from observations of historical users interacting with the business intelligence system. A weight can be assigned to each feature using at least one machine learning model such as a support vector machine.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The current subject matter provides many technical advantages. For example, the current subject matter provides for data retrieval systems that describe user actions to allow for better clustering of the same user interactions and better help to identify user interests for data retrieval. The current subject matter proposes the right item for the users, according to their short or long-term interest, as they considers all past logs. The current subject matter is also advantageous in that it can propose items to a beginner, analyzing his or her current activity, comparing with the clustered events (observations) that describe a user interest per se.

The details of one or more variations of the subject matter described herein are set forth in the accompanying drawing and the description below. Other features and advantages of the subject matter described herein will be apparent from the description and drawings, and from the claims.

DETAILED DESCRIPTION

The current subject matter provides methods, systems, and computer program products (including aspects directed to computer-implemented graphical user interfaces) for traversing datasets generated by a variety of computing platforms including BI systems.

Figure 1:
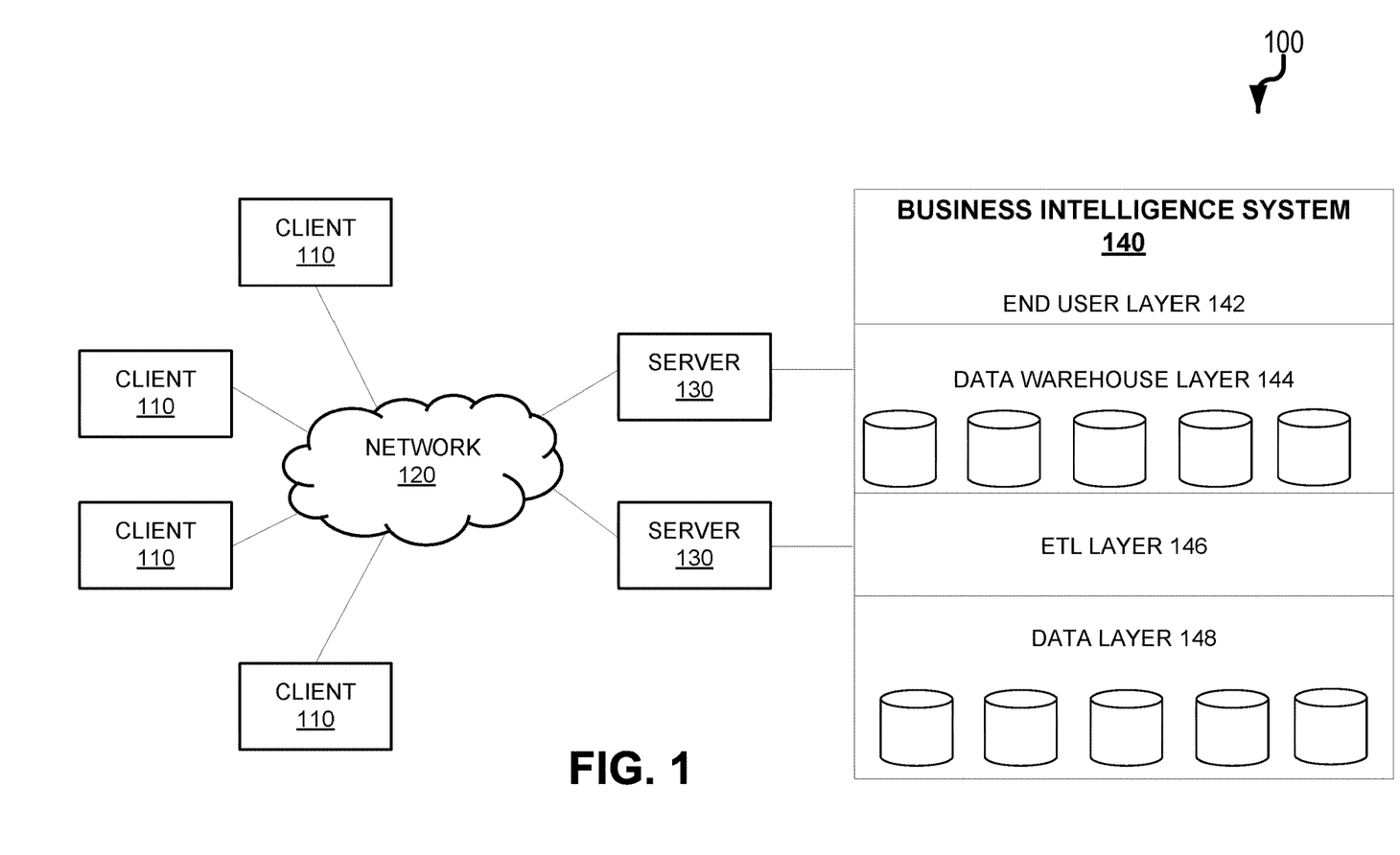
FIG. 1 is a diagram illustrating a computing environment for implementing aspects described herein.

FIG. 1 is a diagram 100 illustrating a sample computing architecture in which various clients 110 (i.e., computing devices) operated by users can access a business intelligence (BI) system 140 via a network 130 and, optionally, one or more intervening servers 130. The BI system 140 can provide rapid access to structured and/or unstructured data of an enterprise and additionally provide one or more of reporting, online analytical processing, analytics, data mining, process mining, complex event processing, business performance management, benchmarking, text mining, predictive analytics and prescriptive analytics. The BI system 140 can also include several layers such as an end user layer 142, a data warehouse layer 144, an ETL layer 146, and a data source layer 148. The end user layer 142 can, for example, include various functionality including analytical application such as data modeling and forecasting, data visualization tools (e.g., graphical user interfaces for rendering on the clients 110 for reporting and manipulation of data, etc.), online analytical processing (OLAP) functionality, data mining, and/or query and reporting tools. The data warehouse layer 144 can include an operational data store to integrate data from various sources (as received from the ETL layer 146) and a data warehouse data store which can, optionally, include one or more data marts. The data warehouse layer 144 can provide the data to the end user layer 142 for ultimate consumption/use by the clients 110. The ETL layer 146 can act to extract transform and load data from the data source layer 148 and can have associated processes and optionally staging areas to implement same. Lastly, the data source layer 148 can comprise various internal data sources (e.g., CRM, ERP systems, etc.) and/or it can act as a gateway or other interface to external data sources such as the Internet and/or remote computing (e.g., web services, cloud storage, etc.).

With the current subject matter, user interests can be characterized by the BI system 140 by means of features extracted from user traces, and such features can be classified in order to group queries related to the same information needs. In addition, with the BI system 140, cross-interaction coherent BI user interests can be discovered. An interaction can rely on a sequence of keyword queries over some data sources in the data source layer 148. Each keyword query corresponds to an ordered set of formal queries suggested from the set of keywords. One of these formal queries, chosen by the user, is evaluated over the data source and the answer retrieved is displayed to the user in the end user layer 142. All this information (keyword query, suggestions and chosen query) is referred to herein as an observation. A set of features are extracted that describe each observation of all user interactions. To group observations into coherent user interests, supervised classification can be used to define a similarity measure that basically assigns a weight to each of the features. Then, the similarity measure can be used with a clustering algorithm to group observations.

The current subject matter provides many technical advantages including, but not limited to: a simple formal model of BI interactions, the identification of a set of features for characterizing BI user interests, the learning of a similarity measure based on these features, an approach to automatically discover user interests based on the current measure and a clustering algorithm, and an extensive set of experiments for the tuning of the current approach, the test of robustness with regard to different clustering algorithms and the comparison of the current measure with a conventional metric tailored for OLAP queries.

Let D be a database schema, I an instance of D and Q be the set of formal queries one can express over D. For illustrative purposes, relational databases under a star schema are considered that are queried with multidimensional queries. Let A be the set of attributes of the relations of D. Let $M \subset A$ be a set of attributes defined on numerical domains called measures. Let $H=\{h_1, \ldots, h_n\}$ be a finite set of hierarchies, each characterized by (1) a subset $Lev(h_1) \subset A$ of attributes called levels, (2) a roll-up total order $\geq h_i$ of $Lev(h_i)$. Let adom(I) be the set of constants of the instance I of D. A database entity can be called an element of the set $A \cup adom(I)$. The result (or answer) of a query q over a database instance I is denoted q(I).

To simplify, a multidimensional query q in Q is described as a set of query parts. A query part is either a level of a hierarchy in H used for grouping, a measure in M, or a simple Boolean predicate of the form A=v involving an attribute A. If a query partp is a selection predicate of the form A=v, or a grouping attribute A, level(p) can be used to denote attribute A. Given two query parts $p_1$ and $p_2$, $FD(p_1, p_2)$ denotes there is a functional dependency level($p_1$)→level($p_2$). Given two queries $q_1$ and $q_2$, the boolean expression OP ($q_1$, $q_2$) indicates if they differ in at most one query part.

Let T be a countably infinite set of strings named tokens. A BI question (or question for short) K is a set of tokens that represents the keywords entered by a user. A token can be interpreted as a word, a number, a date or a set of words, according to the entities it matches in $A \cup adom(I)$.

As keywords are entered, the BI system 140 can, in some variations, on the fly suggest further tokens (for presentation in a GUI in the end user layer 142) to complete the current ones, letting the user choose among them. The BI system 150 is configured to provide a suggestion that completes an original BI question (provided in the end user layer 142 via user-generated input in a GUI) in order to obtain a well-formed query over a database (in the data layer 148). The notion of suggestions can be formalized as follows. A suggestion S is a triple (L, D, q) where L is a BI question, D is a database schema (called source) and q is a query over D. For short, given a suggestion S=(L, D, q), tokens(S), source(S) and query(S) can refer to L, D and q respectively.

Formally, an observation O is a triple o=(K, S, s) where K is a question, S={$s_1, \ldots, s_n$} is a set of suggestions for question K, and s ∈{$s_1, \ldots, s_n$} is the suggestion selected by the user. Given an observation O, it can be noted $K^O$ the question K of o, suggestions(o) its set of suggestions, and chosen(o) the chosen suggestion. It can be noted query(o)= query(chosen(o)), the query of the chosen suggestion, and result(o)=chosen(o)(I), the result set of the evaluated query over a data source instance I. In addition, each observation O can be annotated with a binary property indicating the expertise of the user who interacted with the system, denoted expertise(o).

An interaction of length v is a sequence of v observations i=($o_1, \ldots, o_v$) that represents the user interaction with the BI system 140. Without loss of generality and to keep the formalism simple, it can be assumed that an observation is part of only one interaction. The function interaction(o) returns the interaction to which o belongs. Given two observations $o_x$ and $o_y$ in an interaction, it can be said that $o_y$ refines (is a refinement of) $o_x$ if $o_x$ precedes $o_y$ and either $K^{ox}=K^{oy} \cup \{t\}$ or $K^{oy}=K^{ox} \cup \{t\}$ or $K^{oy}=K^{ox}\setminus\{t\}\cup\{t'\}$.

Given an interaction i=($o_1, \ldots, o_v$), an analysis session (or session for short) can be a sequence of v database queries s=($q_1, \ldots, q_v$), each $q_j$ being the query associated to the chosen suggestion of observation $o_j$, i.e., $q_j$=query(chosen ($o_j$)). A set of sessions can be characterized as a log.

A user interest is a finite set U={$o_1, \ldots, o_n$} of observations that represents one particular information need.

Table 1 presents the basic characteristics that can be use in the current features to describe user interests. Note that $\cup^B$ denotes bag union (preserving duplicates to compute frequencies), P is a set of query parts and matches(t, p) is a binary function indicating if token t matches query part p.

TABLE 1

Basic characteristics of user interests

| Characteristics | Definition | Interpretation |
|---|---|---|
| questions(U) | $\cup_{o\in U} \{K^o\}$ | all the questions |
| tokens(U) | $\cup^B_{o\in U} K^o$ | all the tokens |
| suggestions(U) | $\cup_{o\in U}$ suggestions(o) | all the suggestions |
| chosenSuggest(U) | $\cup_{o\in U}$ chosen(o) | all the chosen suggestions |
| queries(U) | $\cup^B_{o\in U} \{query(o)\}$ | all the chosen queries |
| qParts(U) | $\cup^B_{o\in U}$ query(o) | all the chosen query parts |
| interactions(U) | $\cup^B_{o\in U}$ interaction(o) | all the interactions |
| results(U) | $\cup_{o\in U}$ result(o) | all the results |
| sources(U) | $\cup_{o\in U}$ source(chosen(o)) | all the sources |
| expertise(U) | $\cup_{o\in U}$ expertise(o) | all the expertises |
| refTok(U) | {t ∈ tokens(U) \| ∃o, o' ∈ U, t ∈ ($K^o\setminus K^{o'}$), o refines o'} | tokens that refine other ones |
| matchTok(U, P) | {t ∈ tokens(U) \| ∃p ∈ P, matches(t, p)} | tokens that match a given set of query parts |

The problem of discovering coherent user interests can be formalized as a clustering problem, for which a similarity measure is learned over a set of descriptive features. These features allow to group observations (and user interests) not only based on their intentions expressed by the BI question (in the end user layer 142), but also based on their objectives as expressed by the chosen suggestion, and on their knowledge as provided by the evaluation of the chosen query. To compare two user interests, a global similarity can be computed by the BI system 140 as a weighted sum of feature-based similarity measures. The set of features to consider can be first defined, together with their similarities, then it can be determined how the features are weighted and how contexts are clustered.

Every user interaction can be labeled with the number of analyses that the user is working with. So for each couple of observations, it can be judged if they express the same user interest if they are labeled with the same analysis number. Based on this truth, a matrix of all users similarities can be calculated for each feature, to calculate the features' weights, using, for example, a support vector machine (SVM). The form of this matrix can be as follows:

|  | Feature1 | Feature2 | Feature n | Analysis |
|---|---|---|---|---|
| <obs1-obs2> | 0.3 | 0.5 | 0.9 | 1 |
| <obs1-obs3> | 0.2 | 0.0 | 0.1 | −1 |
| . | | | | |
| . | | | | |
| <obsn-1-obsn> | 1.0 | 0.3 | 0.2 | 1 |

For each couple of users and for each feature, the similarity can be calculated (as described below) between observations and in the last column 1 denotes that the observations correspond to the same analysis and −1 if they do not. This matrix can be enter into a SVM algorithm which produces the weights for the features.

Different weights can be generated for different groups of features selected (as further described below). A same algorithm can be used to learn the weights in the case of smaller subgroup of features. After that, these weights can be used to calculate the total similarity between the observations in order to cluster them.

To provide the best characterization of user interest, a set of candidate features can be defined which can be subsequently analyzed to identify those maximizing the accuracy from the user's perspective. In one example, three groups of features can be considered. The first group of features can relate to the BI questions and suggestions (features 1-6 in Table 2). The second group can relate to the chosen suggestions, and especially their query parts (features 7-9 in Table 2). Both groups proved effective in identifying interests. The third group can comprise specific BI features, and relates to formal queries and their answers (features 10-15 in Table 2).

TABLE 2

Features considered

| # | Feature | Formal definition | Similarity |
|---|---|---|---|
| 1 | Frequency of tokens | freq(tokens($U_1$)) | Cosine |
| 2 | Frequency of refining tokens | freq(refTok($U_1$)) | Cosine |
| 3 | Suggestions | suggestions($U_1$) | NormInt. |
| 4 | BI questions | questions($U_1$) | NormInt. |
| 5 | $U_1$ questions that are sub-questions in $U_2$ | {K ∈ questions($U_1$) \| ∃K' ∈ questions($U_2$), K' ⊂ K} | MaxFrac. |
| 6 | $U_1$ questions in the same interaction as a question in $U_2$ | {$K^o$ \| o ∈ $U_1$, ∃o' ∈ $U_2$, interactions(o) = interactions(o')} | MaxFrac. |
| 7 | Frequency of query parts chosen suggestions | freq(qParts($U_1$)) | Cosine |
| 8 | Frequency of tokens of $U_1$ that match chosen query parts of $U_2$ | freq(matchTok($U_1$, qParts($U_2$))) | Cosine |
| 9 | Chosen suggestions | chosenSuggest($U_1$) | NormInt. |
| 10 | Levels in query parts | {Level(p) \| p ∈ qParts($U_1$)} | Jaccard |

TABLE 2-continued

Features considered

| # | Feature | Formal definition | Similarity |
|---|---------|-------------------|------------|
| 11 | Tuples retrieved by chosen queries | results($U_1$) | NormInt. |
| 12 | Queries in $U_1$ that differ by one query part from a query in $U_2$ | {q ∈ queries($U_1$) | ∃q' ∈ queries($U_2$), OP(q, q')} | MaxFrac. |
| 13 | Sources | sources($U_1$) | MaxFrac. |
| 14 | Attributes of $U_1$ functionally identifying attributes in $U_2$ | {level(p) | p ∈ qParts($U_1$)∃p' ∈ qParts($U_2$), F D(p, p')} | MaxFrac. |
| 15 | Expertise of users | expertise($U_1$) | MaxFrac. |

Table 2 details the features by giving their formal definition and the feature-based similarity measure used for comparing two user interests. The definition is given for a user interest $U_1 = \{o_1^1, \ldots, o_n^1\}$ to be compared to user interest $U_2 = \{o_1^2, \ldots o_m^2\}$. Given a bag of elements x, f req(x) gives a vector counting the number of occurrences of each element of x. For each feature, a similarity measure can be utilized that is the most suited for it (e.g., cosine for vectors of frequencies, Jaccard for sets, etc.). MaxFrac measures the maximum fraction of observations of each user interest that match an observation in the other user interest. Given two interests $U_1$ and $U_2$, it is defined by:

$$MaxFrac(U_1, U_2) = \max\left(\frac{|O_1^s|}{|O_1|}, \frac{O_2^s}{|O_2|}\right),$$

where $O_i^a$ are the observations that satisfy some property over the total number of observations $O_i$ of $U_i$. NormInt is a version of Jaccard similarity, that aims at evaluating the number of features two user interests share. It is defined by $$NormInt(U_1, U_2) = \frac{|F_1 \cap F_2|}{\min(|U_1|, |U_2|)},$$

where $F_1$ are the features of $U_i$ and $|U_i|$ is the number of the set of features for the $i^{th}$ user interest.

Grouping observations into user interests, and then grouping similar user interests, requires addressing two problems: (i) determining a similarity measure between user interests and (ii) finding a clustering algorithm that can work on the sole basis of this similarity. Regarding problem (i), the current subject matter distinguishes among the candidate features presented above those who are the most suitable to identify coherent interests from a user standpoint. To this end, the problem solved herein by the BI system 140 can be characterized as a classification task a simple linear combination of feature-based similarity score can be utilized. The similarity $S(U_1, U_2)$ between user interests $U_1$ and $U_2$ can be defined by:

$$S(U_1, U_2) = \sum w_i v_i(U_1, U_2) \qquad (1)$$

where n is the number of features, $v_i$ is the similarity measure indicated in the Table 2 for feature i and $\omega_i$, is a weight representing this feature's importance in the comparison. To set the weights $\omega_i$, various machine learning models/AI modules can be utilized by the BI system 140 including, for example, a support vector machine (SVM) linear classifier paired with some ground truth knowledge about user interests to learn the predictive value of the feature. More precisely, for a feature i, the weight $\omega_i$ is set to the conditional probability that two observations correspond to the same user interest knowing that they coincide on feature i. This way, the tuning problem of finding an appropriate balance between of all the features based on the interests that are to be discovered can be solved.

Problem (ii) can be addressed using relational clustering algorithms implementing different strategies: centroid-based clustering, connectivity-based clustering and/or density-based clustering.

A metric based on the features can be determined that allows, when paired with a clustering algorithm, to group user observations into clusters that reflect accurately user interests. In this regard, a first experiment aims at determining the best subset of features from the set presented in Table 2. Then, a comparative experiment with a known similarity measure for OLAP sessions shows the effectiveness of the current subject matter in the particular context of user interests discovery. In addition, use of a reference metric as a feature in the similarity measure can improve the overall quality of the current approach for some settings of the features in the current metric and depending on the difficulty of the clustering task.

Additional experiments were implemented to further validate the current approach: (i) sensitivity to the clustering algorithm, (ii) generalization to different inputs with either single observations or clusters of observations related to a business need, and (iii) generalization of the current approach.

The data used for the experiments described herein were based on dataset navigation traces of fourteen individuals covering a wide range of skills in data exploration ranging from data enthusiasts to experienced analysts. In order to evaluate to which extent actual user interests were discovered by the current techniques, 10 business needs (named $Q_1$ to $Q_{10}$) were set, each corresponding to a specific user interest. Users were asked to analyze some of the 7 available data sources to answer each of the 10 business needs, using a prototype that supports keyword-based BI queries (aspects of the current subject matter are related to the subject matter described in U.S. patent application Ser. No. 14/856,984, the contents of which are hereby fully incorporated by reference). The business needs were grouped in different business cases like: "For each European country, detect which genres of films did not reach the expected sales" or "In which Income Group would you classify a candidate country with a GDP of $6 billion?". In order to be more realistic, business needs were defined expecting some overlap in terms of accessed data and queries. In the context of user interest discovery, the business needs $Q_1$ to $Q_{10}$ serve as ground truth, the current objective being to cluster together observations (potentially from different user sessions) that addressed the same business need.

In total, the data set named COMPLETE hereafter contains 23 user sessions accounting for 530 observations. Table 3 describes, for each business need, its difficulty, estimated by an expert (in terms of time, number of queries and exploited sources expected in its resolving), the number of sessions devised for solving it, the number of queries and the number of queries perceived as relevant by users in their own activity. In order to have several difficulty settings, two reduced data sets named REDUCED 1 and 2 were built, each corresponding to 4 business needs and 4 distinct data sources, which in turn removes most of the potential overlap. Each of them contains 225 observations. Importantly, REDUCED 1 and 2 are not related to the same business needs. When dealing with these data sets only 4 well separated clusters are to be found, contrary to the complete data set in which 10 clusters with overlap are expected.

TABLE 3

Analysis of business needs

| | $Q_1$ | $Q_2$ | $Q_3$ | $Q_4$ | $Q_5$ | $Q_6$ | $Q_7$ | $Q_8$ | $Q_9$ | $Q_{10}$ |
|---|---|---|---|---|---|---|---|---|---|---|
| Difficulty | low | med | med | med | low | high | low | low | med | high |
| Number of sessions | 19 | 11 | 10 | 10 | 10 | 8 | 9 | 9 | 9 | 8 |
| Number of queries | 84 | 65 | 60 | 41 | 50 | 43 | 61 | 51 | 26 | 49 |
| Number of relevant queries | 34 | 26 | 30 | 16 | 26 | 10 | 27 | 24 | 24 | 9 |
| Queries/session | 4.4 | 5.9 | 6.0 | 4.1 | 5.0 | 5.4 | 6.8 | 5.7 | 2.9 | 6.1 |
| Relevant queries/session | 1.8 | 2.4 | 3.0 | 1.6 | 2.6 | 1.25 | 3.0 | 2.7 | 2.7 | 1.1 |

One objective of the current subject matter is to build groups of observations that are only related to a single user interest. The main indicator of success is thus the precision of the clustering when compared to the theoretical grouping of observations provided by the business questions. At a second level, recall allows to determine to which extent each cluster covers all of the observations related to a user interest. Finally, the classical Adjusted Rand Index (ARI) can be used to evaluate the overall quality of the clustering. The values of this index range from around 0 (when the clustering performs badly and produces a partition close to a random clustering) and 1 (when the clustering is perfect).

The feature weights can be learned over 50% of all observations chosen randomly, with a balance in the number of observations per business needs. With the objective of finding the subset of features that maximizes the quality of the discovery of user interests, several subsets of features were tested and the weights of the metric were trained with a linear SVM algorithm on the sole basis of these features. The subsets of features are selected as follows. All 15 features described in Table 2 were considered and the metric was learned. The linear SVM outputs weights that traduce the relative importance of each feature. It is thus possible to order features by the absolute value of their weights. This ranking allows to form subsets of features starting from those with only highly weighted features to subsets that covers more widely the whole set of features. In order to limit to a few subsets, results for the following subsets can be given. G2={1, 3, 7, 8, 9}, G3=G2 ∪{5, 10, 11, 13, 14} and ALL cover the features with the highest relative importance (respectively the top-5, top-10 and all features). A group G1={7, 8, 9, 10, 13} can be constituted that includes top-5 features selected by repetitively adding to the group features that increase precision. Note that G3 includes both G1 and G2. Finally, groups G4={1, 2, 3, 4, 5, 6} and G5={7, 8, 9, 10, 12, 13, 14} are specific groups of features related only to keywords (G4) and query parts (G5).

As no hypothesis can a priori be made on the shape of expected groups of observations, several clustering algorithms can be used that are relational i.e., only based on the expression of a distance or dissimilarity between pairs of data instances. The first method is the PAM algorithm that is a k-medoids algorithm that finds hyperspherical clusters centered around the k most representative observations. Agglomerative hierarchical clustering algorithms can also be used with single and complete linkage criterion to either allow for elongated or compact clusters. Finally, a DBSCAN algorithm can be used that is not restricted to a specific shape of cluster but constraint clusters to share the same density of points.

The techniques described herein (including any related graphical user interfaces) can be implemented in Java but can also use Python Scikit Learn linear SVM to learn the weights of the current similarity measure and R clustering packages cluster for k-medoids and hierarchical clustering, as well as fpc for DBSCAN clustering.

TABLE 4

Clustering results with distinct subset of features on COMPLETE data set.
For short, Rec, Prec and ARI denote respectively recall, precision and ARI scores.

| | H. Single | | | H. Complete | | | PAM | | | DBSCAN | | |
|---|---|---|---|---|---|---|---|---|---|---|---|---|
| Features | Rec. | Prec. | ARI | Rec. | Prec. | ARI | Rec. | Prec. | ARI | Rec. | Prec. | ARI |
| ALL | 0.96 | 0.11 | 0.002 | 0.49 | 0.34 | 0.315 | 0.52 | 0.46 | 0.42 | 0.82 | 0.11 | 0.008 |
| G1 | 0.90 | 0.11 | 0.0004 | 0.67 | 0.12 | 0.026 | 0.43 | 0.40 | 0.35 | 0.86 | 0.11 | 0.006 |
| G2 | 0.92 | 0.11 | −0.0001 | 0.68 | 0.11 | 0.006 | 0.51 | 0.50 | 0.44 | 0.73 | 0.11 | 0.017 |
| G3 | 0.97 | 0.11 | 0.001 | 0.38 | 0.28 | 0.23 | 0.52 | 0.47 | 0.43 | 0.77 | 0.11 | 0.007 |
| G4 | 0.96 | 0.11 | −0.0005 | 0.67 | 0.14 | 0.06 | 0.47 | 0.29 | 0.26 | 0.85 | 0.11 | −0.0008 |
| G5 | 0.91 | 0.11 | 0.0004 | 0.39 | 0.28 | 0.23 | 0.45 | 0.42 | 0.37 | 0.75 | 0.11 | 0.01 |

Table 4 shows that the quality of the discovered groups of observations heavily depends first on the subset of features as expected, but also on the clustering algorithm used. It can be seen that approaches like the hierarchical clustering with single link criterion and DBSCAN algorithms that allows for elongated clusters achieve very poor precision results (Prec=0.11). This can be explained by the fact that these two algorithms are sensitive to potential overlapping between clusters. In the current case, similarities between user interests cause early unwanted merging between groups of observations. The stability in precision traduces the fact that these two approaches constantly built a majority of mono-observation clusters and one cluster with almost all the observations, whatever the group of features considered. At the opposite, clustering algorithms that favor compact clusters like the hierarchical clustering with complete link or the k-medoids PAM algorithms perform better. PAM performs significantly better than the hierarchical complete link algorithm, knowing that standard deviations (not reported here for the sake of clarity) do not exceed $10^{-2}$ and are most of the time around $10^{-3}$. Finally, when considering only PAM, it can be seen that the subset of features G2 outperforms all the others. Interestingly, these features are those that had the most discriminating behaviour based on the SVM weights observed on all 15 features. Adding more features only slightly increases recall. Other strategies (not mixing features from different specific groups, etc.) can dramatically harm precision. It is also important to note that subset G2 does not include BI specific features, which indicates that enough semantics is beared by the other features in detecting user interests. From the previous findings, G2 can be defined as the set of features and PAM clustering can be used in the remaining tests, unless otherwise stated.

While the current metrics can be learned on observations, the experimental protocol aims at grouping together observations participating in the analysis of a business need. To understand the behaviour of the G2 metric, it was tested to see how it degrades when applied to analyses and then to observations. Analyses are defined as sets of observations participating to answering the same need. This is unlikely to be detected in practice, and this information was explicitly asked to the users when they answered the different needs. As shown in Table 5, when applied on analysis, the current metric achieves optimal to very good performance. In the easiest case, when user interests are clearly distinct from each other and rich information is provided to the current algorithm(s) with analyses rather than observations, the clustering fits perfectly, with precision, recall and ARI scores equal to 1. Interestingly when analyses are clustered based on the metric learned on observations (denoted as "Analysis (weight obs.)"), the results are identical to the previous results. At the contrary, learning metric weights on the basis of complete groups of observation (although not realistic) does not conduct to good clusters of observations, with significantly lower scores. As a conclusion, this experiment validates the choice of learning weights on observations and the choice of the G2 features.

TABLE 5

Behaviour of G2 set of features with PAM clustering when learning weights over observations or analyses. (weight obs), and (weight ana.) means that weights are leanred over observations or analyses, respectively.

| | Complete | | | Reduced 1 | | |
|---|---|---|---|---|---|---|
| Input | Recall | Precision | ARI | Recall | Precision | ARI |
| Observations | 0.51 | 0.50 | 0.44 | 0.70 | 0.64 | 0.54 |
| Analysis | 0.80 | 0.74 | 0.74 | 1.0 | 1.0 | 1.0 |
| Analysis (weight obs.) | 0.80 | 0.74 | 0.74 | 1.0 | 1.0 | 1.0 |
| Observations (weights ana.) | 0.44 | 0.42 | 0.36 | 0.61 | 0.59 | 0.45 |

TABLE 6

Comparison of our metric based on G2 features with other metrics when paired with PAM clustering. ALL denotes the set of 15 features, [3] is the state-of-art metric and "+" indicates a metric with added features and corresponding weights.

| | Complete | | | Reduced 1 | | |
|---|---|---|---|---|---|---|
| Features | Recall | Precision | ARI | Recall | Precision | ARI |
| ALL | 0.52 | 0.46 | 0.42 | 0.73 | 0.64 | 0.56 |
| G2 | 0.51 | 0.50 | 0.44 | 0.70 | 0.64 | 0.54 |
| Metric [3] | 0.39 | 0.20 | 0.14 | 0.41 | 0.33 | 0.10 |
| ALL + [3] | 0.40 | 0.40 | 0.32 | 0.78 | 0.65 | 0.63 |
| G2 + [3] | 0.45 | 0.43 | 0.38 | 0.69 | 0.62 | 0.52 |

Table 6 shows how the current metric compares to a reference metric designed for OLAP queries. This metric has been validated by user tests that showed its effectiveness in grouping queries in accordance to what a human expert would have done. Table 6 reveals 2 distinct behaviors depending on whether the COMPLETE data set or the REDUCED 1 (where clusters are well separated) is considered. With the COMPLETE data set, the current metric with G2 features performs better than the other metrics as it only relies on the most discriminating features. Indeed, it is known from the protocol that groups of observations heavily overlap. Thus, the current metric learning based on SVM cannot find a proper linear separation between observations related to different user interests. In this particular context, adding more features makes the problem even more complex to solve for SVM as it has to determine a compromise solution over 15 dimensions rather than 5 in the case of G2 features, and with only a few training instances. On the contrary, with the REDUCED 1 set of observations, groups are clearly separable, the problem is much easier for the linear SVM and adding features may help finding a better solution by fine tuning the separation hyper plane. Consequently, in this case, slightly better results may be achieved with other features than G2's. The current approach can be shown to be the most efficient in any scenarios and the hypothesis that clusters of observations are clearly separated is too strong for us. Thus, the metric based on G2 features seems to be the most appropriate among those evaluated.

In this experiment, it is studied how the current method handles previously unseen business needs and how general is the metric learned on the G2 features. To this aim, both REDUCED data sets are considered and one is used to train the metric and the other to test with PAM clustering. Recall that reduced data sets cover different business needs, with no overlap among them. Results in Table 7 show that the current metric is indeed general and can adapt to new business needs as there is no drop in performance between each of the generalization tests. Moreover, the results are comparable to those observed in previous tests as reported in Table 6. Finally, it can be seen that testing on REDUCED 2 leads to better results than with REDUCED 1. This is expected as REDUCED 2 contains observations related to business need Q9 that has more relevant queries than need Q10 contained in the REDUCED 1 data set (see Table 3).

TABLE 7

Generalization of our approach. Each test correspond
to the training of the metric and discovery of user
interests on different subsets of business needs.

| Training | Testing | Recall | Precision | ARI |
|---|---|---|---|---|
| REDUCED 2 | REDUCED 1 | 0.76 | 0.67 | 0.61 |
| REDUCED 1 | REDUCED 2 | 0.73 | 0.71 | 0.62 |

To illustrate one practical interest of the current metric, a test was conducted that included successively increasing the number of clusters and checking how many users of different expertise are represented in each cluster. The aim is to show that the current metric is good not only at grouping observations that participate to the resolution of a particular business need, but also at identifying parts of the resolution that are shared by users with different profiles. To emphasise on the evolution of precision (which indicates the coherence of clusters), the best configuration from a previous comparative experiment can be used and tested on the well separated REDUCED 1 data set, starting with 10 clusters. The results reported in Table 8 show how the mixing of users decreases while precision increases (and consequently recall and ARI decrease) as the number of clusters increase. It can be noted that for high precisions, the composition of clusters in terms of users with different expertises remain very acceptable. For instance, when precision reaches 95%, more than 63% of clusters have users with different expertise. In other words, this shows that the current metric can be used to identify shared sub-tasks (or intra-interaction interests) where some experts' queries could be recommended to beginner users having to solve the same business need.

TABLE 8

Increasing the number of clusters to detect intra-interaction interests.
Dense UI indicates the number of clusters with more than 5 different
users. Expertise indicates the number of clusters with only one
type of users.

| # clusters | Recall | Precision | ARI | Dense UI | Expertise |
|---|---|---|---|---|---|
| 10 | 0.35 | 0.86 | 0.41 | 10 (100%) | 0 (0%) |
| 15 | 0.24 | 0.90 | 0.31 | 14 (93.3%) | 1 (6.67%) |
| 20 | 0.20 | 0.92 | 0.26 | 14 (70%) | 2 (10%) |
| 25 | 0.18 | 0.92 | 0.24 | 13 (52%) | 6 (24%) |
| 30 | 0.17 | 0.95 | 0.23 | 13 (43.3%) | 11 (36.67%) |
| 35 | 0.16 | 0.95 | 0.22 | 12 (34.3%) | 16 (45.71%) |
| 50 | 0.14 | 0.96 | 0.19 | 11 (22%) | 30 (60%) |

The current subject matter provides further technical advantages in that it allows for automatic discovering of BI users' interests in a BI system 140 that is part of a multi-user environment. In addition, an approach is presented for identifying coherent interests of BI users with various expertise querying datasources by means of keyword-based analytical queries. The current approach relies on the identification of discriminative features for characterizing BI interactions and on the learning of a similarity measure based on these features. It has been shown through user tests that the current approach is effective in practice and could benefit beginner analysts whose interests match those of expert users.

Figure 2:
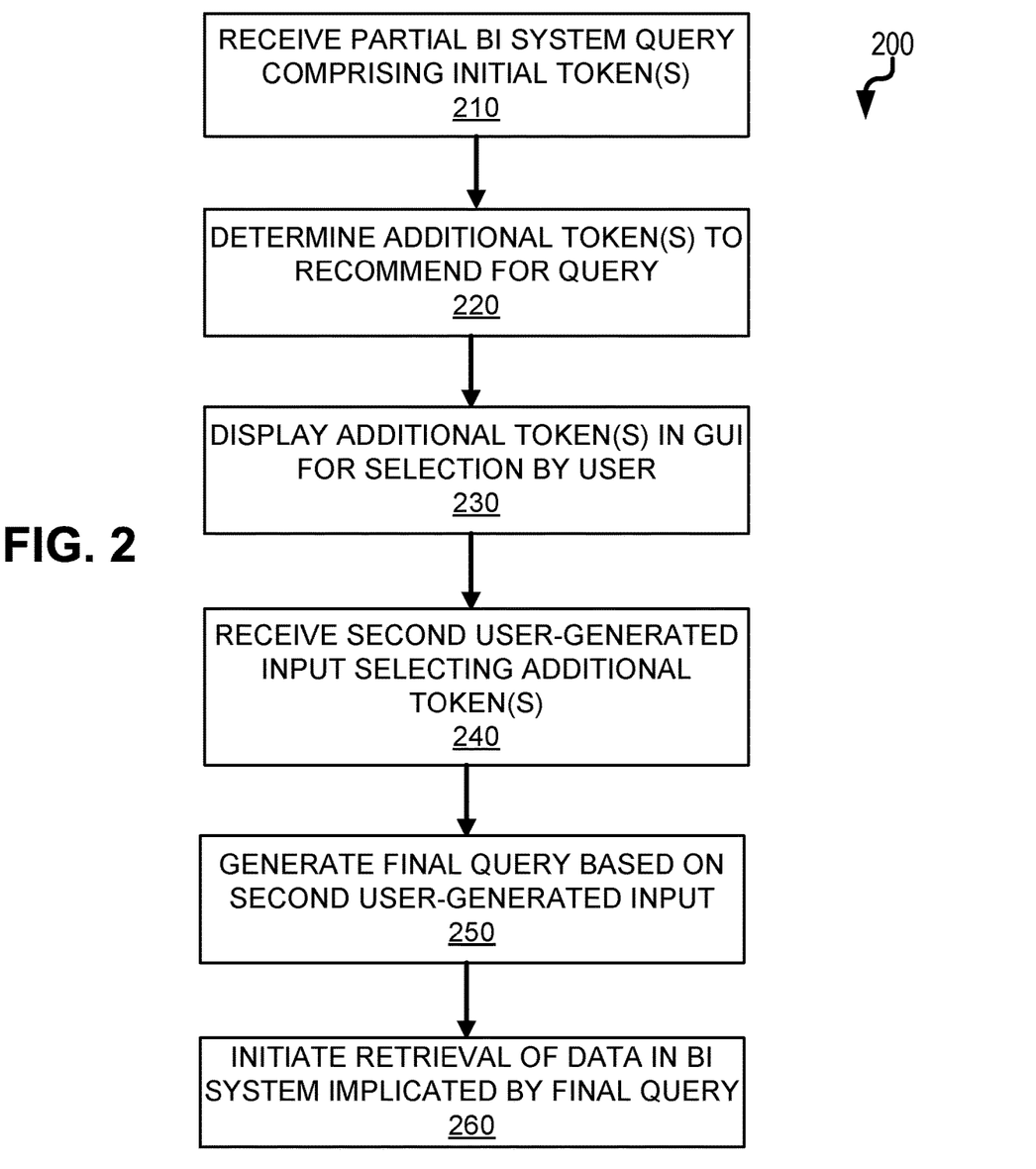
FIG. 2 is process flow diagram illustrating business intelligence system dataset navigation based on user interests clustering.

FIG. 2 is a diagram 200 in which, at 210, first user-generated input is received in a graphical user interface forming part of an end-user layer of a business intelligence system that comprises a partial query of the business intelligence system. The first user-generated input includes at least one initial token. A data warehouse layer of the business intelligence system then determines, at 220, at least one additional token to recommend for the query. The determined at least one additional token can then be displayed, at 230, in the graphical user interface. Second user-generated input by the user is then received, at 240, in the graphical user interface that selects one or more of the at the at least one additional token. The data warehouse layer then, at 250, generates a final query based on the received second user-generated input. The data warehouse layer can then, at 260, initiate retrieval of data by the final query. The determining can be based, for example, on a clustering of interests of the user based on pre-defined clusters. The pre-defined clusters being based on similarity measures among features of historical queries of the business intelligence system that indicate similar user interests.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 3:
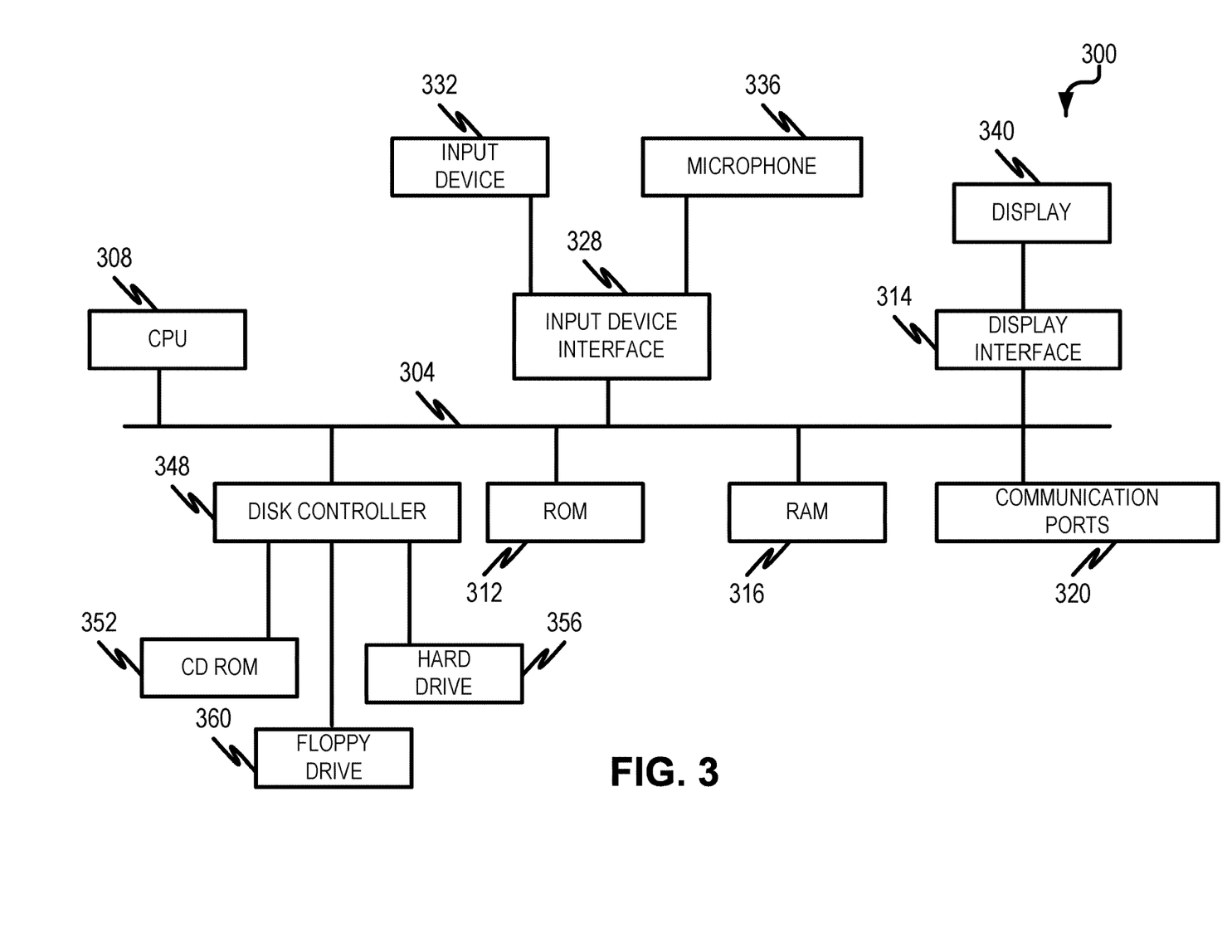
FIG. 3 is a system diagram illustrating a computing device for implementing aspects of the current subject matter.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336 and/or tactile feedback); and input from the user can be received in any form, including acoustic, speech, or tactile input. In the input device 332 and the microphone 336 can be coupled to and convey information via the bus 304 by way of an input device interface 128. Other computing devices, such as dedicated servers, can omit one or more of the display 340 and display interface 324, the input device 332, the microphone 336, and input device interface 328.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device, the method comprising:

receiving, in a graphical user interface forming part of an end-user layer of a business intelligence system, first user-generated input by a user comprising a partial query, the first user-generated input comprising at least one initial token;

determining, by a data warehouse layer of the business intelligence system, at least one additional token to recommend for the query;

displaying, in the graphical user interface, the determined at least one additional token;

receiving, in the graphical user interface, second user-generated input by the user selecting one or more of the at least one additional token;

generating, by the data warehouse layer, a final query based on the received second user-generated input; and initiating, by the data warehouse layer, retrieval of data implicated by the final query;

wherein:

features are extracted from each of a plurality of observations associated with historical queries, the observations each comprising: (i) a corresponding keyword query, (ii) suggestions provided in connection with such query, and (iii) a corresponding chosen query;

similarity measures are defined, using at least one machine learning model using supervised classification, for the extracted features that assign a weight to each of the extracted features;

the similarity measures are used with a clustering algorithm to group the observations into clusters;

the determining is based on clusters.

2. The method of claim 1, wherein the similarity measures are selected from a group consisting of: cosine-based similarity measures, maximum fraction of observations-based similarity measures, Jaccard-based similarity measures, or normal integer-based similarity measures.

3. The method of claim 1, wherein the features extracted from the observations further comprise features selected from a group consisting of: frequency of tokens, frequency of refining tokens, suggestions, business intelligence questions, hierarchical questions relationships, or temporal question relationships.

4. The method of claim 1, wherein the features extracted from the observations further comprise of historical queries are selected from a group consisting of: frequency of query parts of a selected suggestion or frequency of matching tokens forming parts of queries.

5. The method of claim 1, wherein the features extracted from the observations further comprise features selected from a group consisting of: levels in query parts, tuples retrieved by chosen queries, differences in queries that are below a pre-defined threshold, data sources implicated by the query, attributes of a first query identifying attributes of a second query, or expertise level of users.

6. The method of claim 1, wherein the clustering algorithm employs a technique selected from a group consisting of: centroid-based clustering, connectivity-based clustering, or density-based clustering.

7. The method of claim 1, wherein the at least one machine learning model is a support vector machine.

8. A system comprising:
at least one data processor; and
memory storing instructions which, when executed by the at least one data processor, result in operations comprising:
receiving, in an graphical user interface forming part of an end-user layer of a business intelligence system, first user-generated input by a user comprising a partial query, the first user-generated input comprising at least one initial token;
determining, by a data warehouse layer of the business intelligence system, at least one additional token to recommend for the query;
displaying, in the graphical user interface, the determined at least one additional token;
receiving, in the graphical user interface, second user-generated input by the user selecting one or more of the at least one additional token;
generating, by the data warehouse layer, a final query based on the received second user-generated input; and
initiating, by the data warehouse layer, retrieval of data implicated by the final query;
wherein:
features are extracted from each of a plurality of observations associated with historical queries, the observations each comprising: (i) a corresponding keyword query, (ii) suggestions provided in connection with such query, and (iii) a corresponding chosen query;
similarity measures are defined, using at least one machine learning model using supervised classification, for the extracted features that assign a weight to each of the extracted features:
the similarity measures are used with a clustering algorithm to group the observations into clusters;
the determining is based on the clusters.

9. The system of claim 8, wherein the similarity measures are selected from a group consisting of: cosine-based similarity measures, maximum fraction of observations-based similarity measures, Jaccard-based similarity measures, or normal integer-based similarity measures.

10. The system of claim 8, wherein the features extracted from the observations further comprise features selected from a group consisting of: frequency of tokens, frequency of refining tokens, suggestions, business intelligence questions, hierarchical questions relationships, or temporal question relationships.

11. The system of claim 8, wherein the features extracted from the observations further comprise of historical queries are selected from a group consisting of: frequency of query parts of a selected suggestion or frequency of matching tokens forming parts of queries.

12. The system of claim 8, wherein the features extracted from the observations further comprise features selected from a group consisting of: levels in query parts, tuples retrieved by chosen queries, differences in queries that are below a pre-defined threshold, data sources implicated by the query, attributes of a first query identifying attributes of a second query, or expertise level of users.

13. The system of claim 8, wherein the clustering algorithm employs a technique selected from a group consisting of: centroid-based clustering, connectivity-based clustering, or density-based clustering.

14. The system of claim 8, wherein the at least one machine learning model is a support vector machine.

15. A method for implementation by one or more data processors forming part of at least one computing device, the method comprising:
receiving, in a graphical user interface forming part of an end-user layer of a business intelligence system, first user-generated input by a user comprising a partial query, the first user-generated input comprising at least one initial token;
determining, by a data warehouse layer of the business intelligence system, at least one additional token to recommend for the query, the determining being based on historical queries conducted by a plurality of users having features which are clustered using a plurality of different similarity measure techniques;
displaying, in the graphical user interface, the determined at least one additional token;
receiving, in the graphical user interface, second user-generated input by the user selecting one or more of the at least one additional token;
generating, by the data warehouse layer, a final query based on the received second user-generated input; and
initiating, by the data warehouse layer, retrieval of data implicated by the final query;
wherein:
features are extracted from each of a plurality of observations associated with historical queries, the observations each comprising: (i) a corresponding keyword query, (ii) suggestions provided in connection with such query, and (iii) a corresponding chosen query;
similarity measures are defined, using at least one machine learning model using supervised classification, for the extracted features that assigns a weight to each of the extracted features;
the similarity measures are used with a clustering algorithm to group the observations into clusters;
the determining is based on the clusters.

* * * * *